UNITED STATES PATENT OFFICE.

FRANK W. FEWINS, OF ST. LOUIS, MISSOURI, ASSIGNOR OF ONE-HALF TO OLIVER H. P. GRUNDON, OF SAME PLACE.

COMPOSITION FOR COLORING AND TINTING.

SPECIFICATION forming part of Letters Patent No. 443,361, dated December 23, 1890.

Application filed June 30, 1890. Serial No. 357,287. (No specimens.)

*To all whom it may concern:*

Be it known that I, FRANK W. FEWINS, of St. Louis, in the State of Missouri, have invented certain new and useful Improvements in a Composition for Coloring and Tinting, of which the following is a full, clear, and exact description.

My invention has for its object to provide a composition for coloring and tinting to be used in decorating, the ingredients of which, when combined as hereinafter described, can be applied to the walls, ceiling, or any other part of a house, and which composition can be given any desired tint by any suitable coloring-matter.

My composition consists of the following ingredients combined or mixed in the proportions stated, though they may be somewhat varied, if found desirable to do so, viz: whiting or any other water-color mineral, five pounds; a sufficient quantity of pure water to soften the said whiting; soluble glass, three pounds; one pint of boiled linseed-oil, and a sufficient quantity of coloring-matter, such as ocher or umber. These ingredients are to be thoroughly mingled by agitation.

By the use of the above-named composition a hard enamel can be applied to the wall, ceiling, or any other part of a house, and is especially applicable for interior decoration.

By suitable coloring-matter the composition can be given any hue or tint desired, and which can be applied in the well-known way by a brush or the like and with as many coats as may be desired.

This composition is not affected by water, grease, or the like, and, further, cannot be easily disfigured, the properties of which forming a hard enamel of a glossy appearance, as heretofore stated.

When the ingredients are mixed, they form solely a washable water-color or calcimine, which when too thick can be thinned by water.

What I claim is—

The herein-described composition of matter to be used for coloring and tinting, consisting of water, whiting or other water-color mineral, soluble glass, boiled linseed-oil, and suitable coloring-matter, in or about the proportions herein specified.

In testimony whereof I affix my signature in presence of two witnesses.

FRANK W. FEWINS.

Witnesses:
JNO. C. HIGDON,
JAMES RYAN.